UNITED STATES PATENT OFFICE.

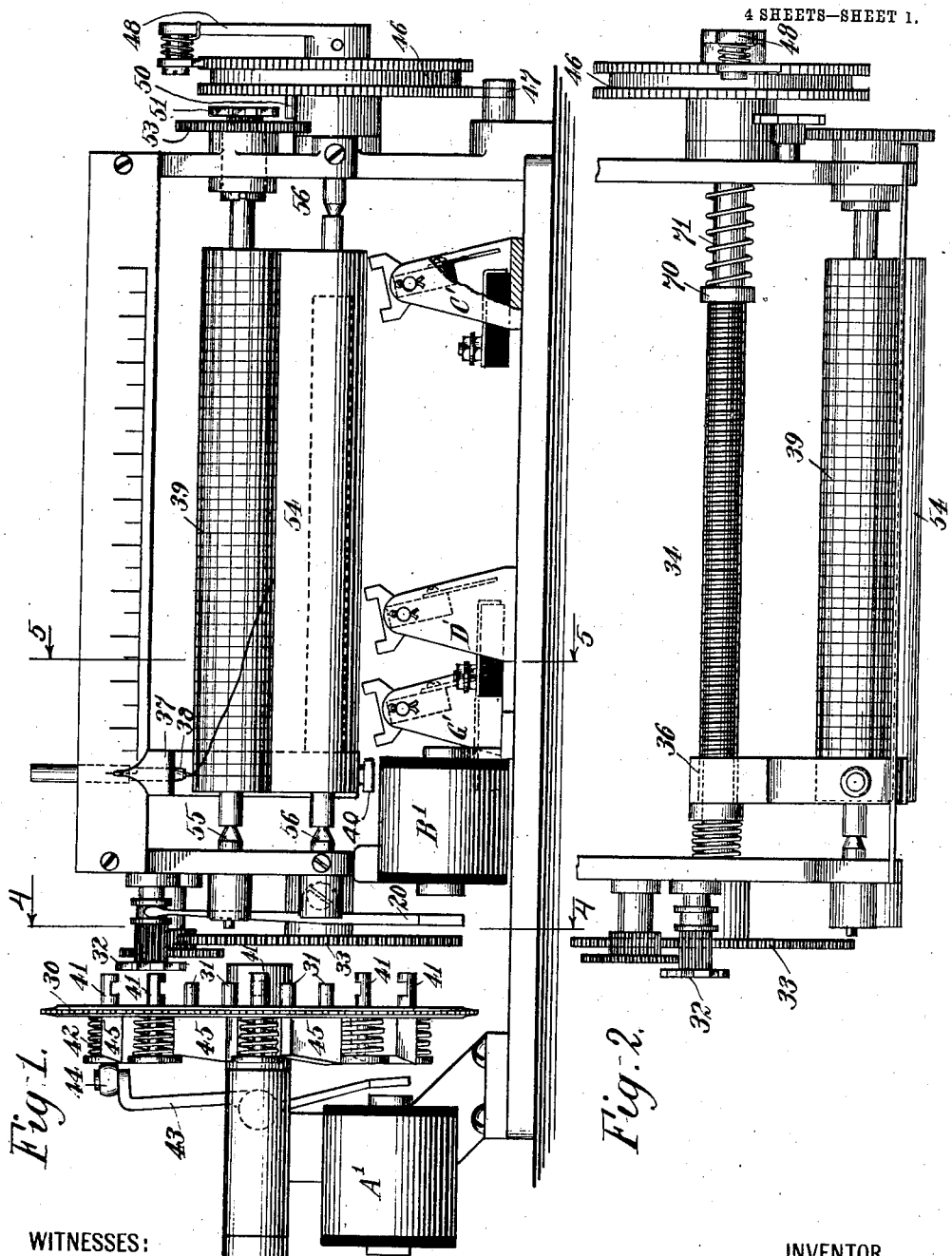

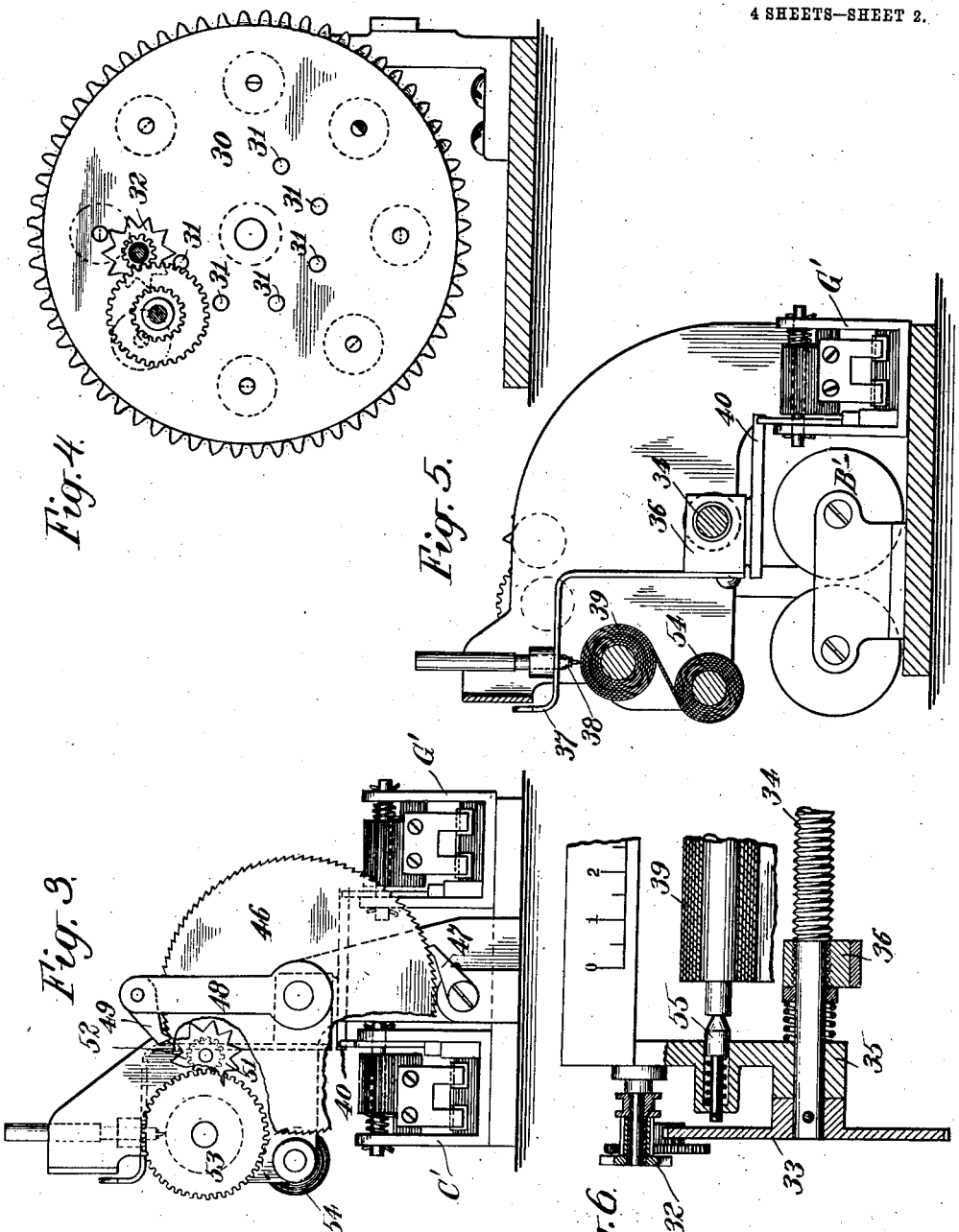

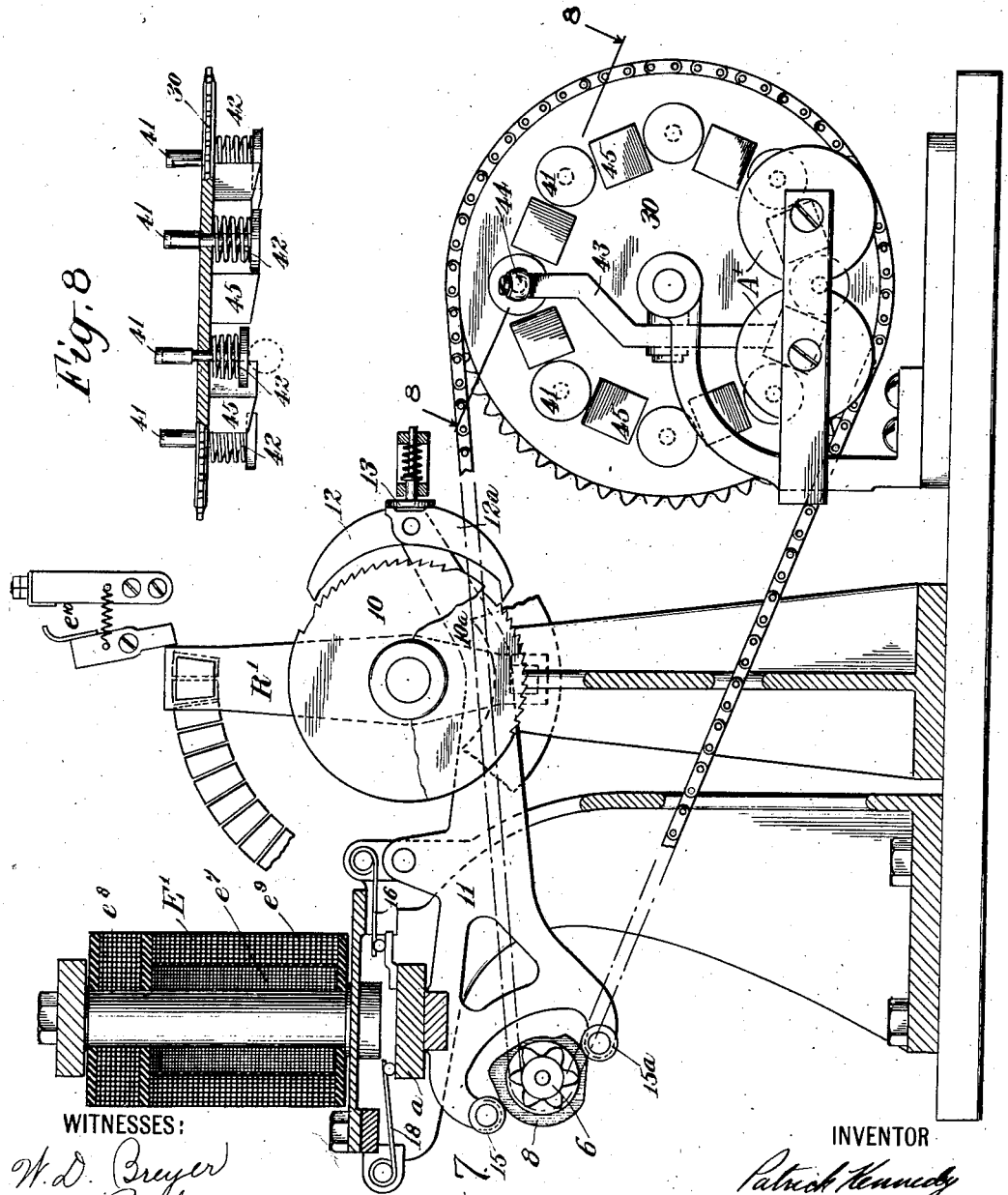

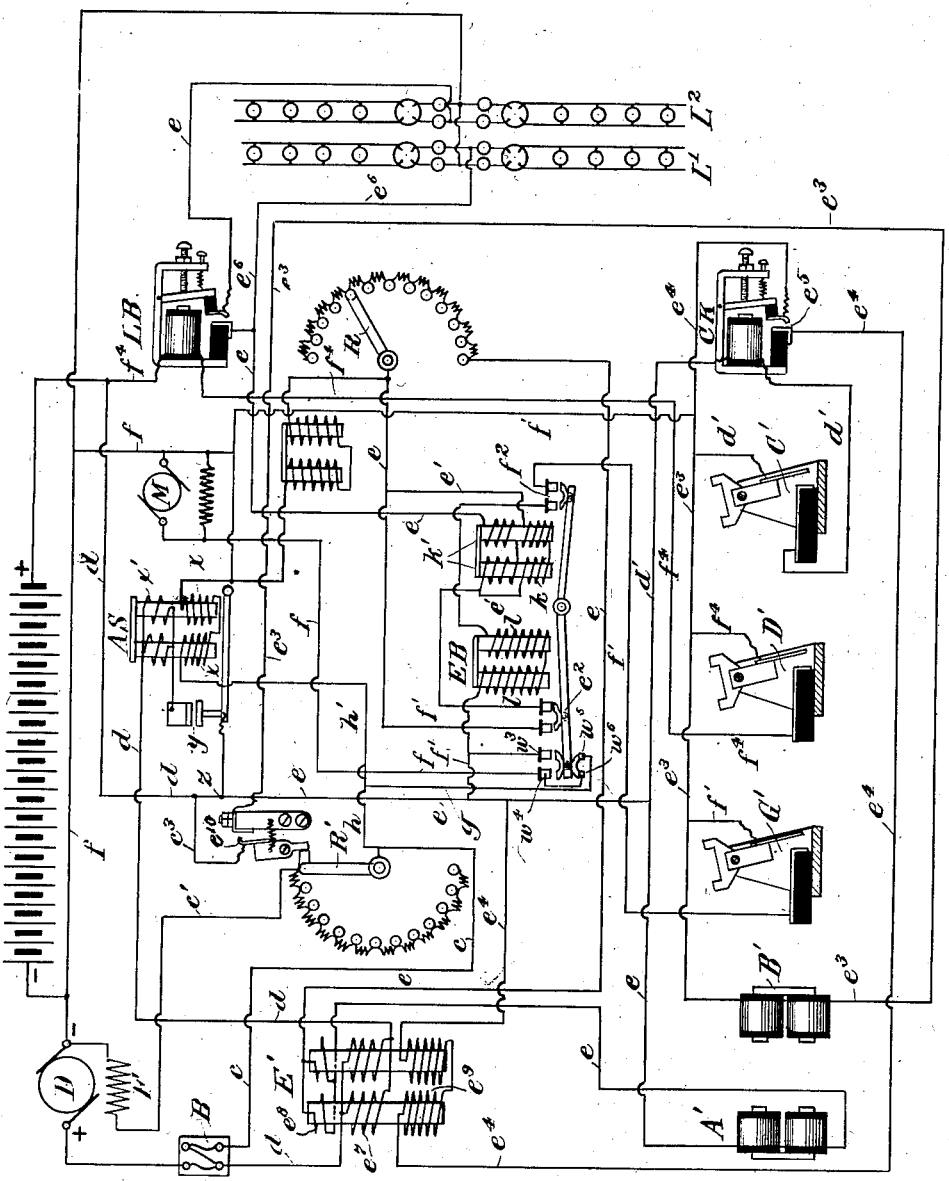

PATRICK KENNEDY, OF NEW YORK, N. Y.

ELECTRIC-CURRENT-SUPPLY SYSTEM.

1,019,483.  Specification of Letters Patent.  Patented Mar. 5, 1912.

Application filed October 26, 1908. Serial No. 459,485.

*To all whom it may concern:*

Be it known that I, PATRICK KENNEDY, a citizen of the United States, residing in the borough of Brooklyn, city, county, and State of New York, have invented certain new and useful Improvements in Electric-Current-Supply Systems; and I do hereby declare the following to be a full, clear, and exact description of the invention, such as will enable others skilled in the art to which it appertains to make and use the same.

The invention relates primarily to a system for supplying electrical energy to translating devices from a generator, and particularly an intermittently driven generator, when used in conjunction with a storage-battery which is charged from the generator and discharges to the translating devices when the generator is not in operation.

The invention is of a peculiar value in connection with train lighting systems in which the storage battery is charged from a generator driven from the axle of the moving vehicle, so that the generator is constantly driven when the vehicle is in motion and is not driven when the vehicle is at rest.

The invention broadly considered relates to a system of the same general character as the system described in my application for United States Letters Patent filed March 17, 1908, Serial No. 421,662, and embodies various improvements upon that system. In that system means are provided for charging the battery automatically to its full capacity regardless of the variations in the internal condition thereof, and yet a long continued overcharge of the battery is automatically prevented. That system further provides means for preventing an over-discharge of the battery, and it includes specifically an index capable of being easily read and which shows approximately the condition of charge of the battery, and it further includes a device for making a permanent record of the charge and discharge of the battery.

In accordance with the present invention that system is so modified that the entire control is automatic, and does not necessitate any deliberate act on the part of the train hands or the users of the lights, other than the turning on and off of the lights.

The present improvements also include specific modifications in the indicating and recording mechanism.

In the drawings Figure 1 is a front elevation of the modified indicating and recording mechanism, Fig. 2 is a top plan view of the same, Fig. 3 is an elevation, with parts broken away, of the right-hand end of Fig. 1, Fig. 4 is a section on the line 4—4 of Fig. 1, Fig. 5 is a section on the line 5—5 of Fig. 1 and Fig. 6 is a fragmentary detail showing the mechanism for operating the screw which actuates the recording device and also showing the mounting of that screw and its associated parts and of the paper reel of the recording device. Fig. 7 is an elevation partly in section of the left-hand end of the recording device shown in Fig. 1, together with the associated parts of the regulator which forms part of the apparatus; Fig. 8 is a section on the line 8—8 of Fig. 7 and Fig. 9 is a diagram of the circuit connections.

The regulator illustrated in Fig. 7 is of the same general character as the regulator disclosed in my prior Patents #745,194 of November 24, 1903 and #800,114 of September 19, 1905, though the utility of the invention is in no wise limited to that particular regulating means, but, on the contrary, any other suitable regulating means may be employed.

Referring to Fig. 7 of the drawings it will be observed that the sprocket wheel 30 of the indicating and recording device is driven by chain from the cam shaft 6 of the regulator. Sprocket wheel 30 carries a series of short charge-indicating pins 31 of which six are shown, though the number employed depends upon the degree of closeness of indication desired. With the parts in the position shown in Fig. 1, which indicates the inert position of the parts, the sprocket wheel 30 rotates freely without affecting the indicating mechanism. If, however, the shunt magnet B' is excited from the generator it will attract its armature 20 and thereby advance the star wheel 32 toward the face of sprocket wheel 30 until it is in position to be engaged, on its lower side, by the pins 31, and thereby rotated, as the sprocket wheel 30 rotates. This rotation of star wheel 32 is transmitted through the intermediate gear shown to the sprocket wheel 33, which is secured to the end of the screw 34 of the indicating and recording device. This screw is mounted in suitable bearings 35 in the frame of the device and has a traveler or nut 36 which carries a pointer 37, which moves over a fixed scale as shown. The traveler 36 also carries the stylus or pencil 38 which bears on the paper reel 39 to make a permanent record of the charge and discharge. The lower end of the traveler 36 carries a projection 40 which serves to trip the snap switches G' and D' and C' at different points in its movement in either direction, thus opening or closing circuits that control magnetically operated switches, the functions of which will be fully described later. Sprocket wheel 30 also carries a series of discharge-indicating plungers 41 shown as eight in number, but the number of which depends upon the closeness of indication desired. These plungers are held in their retracted positions by springs 42 (see Fig. 8) of various degrees of tension, when the magnet A' is not excited. When the magnet A' is excited, which occurs when lamps are turned on, as will be hereinafter explained, its armature will be attracted to turn lever 43 to press the roller 44 on the end of that lever against the head of that particular plunger 41 which is in position to engage star wheel 32. This pressure, if it is strong enough to overcome the spring of that particular plunger, will force the plunger forward into position to engage the upper side of the star wheel 32. The number of plungers that will be thus projected into contact with the star wheel at each revolution of the sprocket wheel will depend upon the amount of current flowing to the lamps, because the springs 42 are of progressively increasing strength so that at the minimum current which it is desired to record only one of the plungers 41 will be operated and at the maximum current the whole eight will be operated, and at intermediate currents an appropriate number of the plungers less than eight will be operated. It will be observed that with the plungers in their retracted positions they will not engage the star wheel 32 when it is in the position shown in Fig. 1 of the drawings, and when the star wheel is in the advanced position which it assumes upon the excitation of magnet B' it will lie in the notches shown in the plungers 41, so that the star wheel 32 will not be actuated by those plungers when they are in their retracted positions in any event. When, however, the plungers are in their advanced position, and star wheel 32 is retracted, the star wheel will be actuated by the portion of the plunger at the right of the notch, and when the star wheel is in advanced position, and plunger 41 is advanced, the star wheel will be actuated by that portion of the plunger which is to the left of the notch. The resultant effect is that the charging current of the storage battery, which through an appropriate shunt energizes magnet B', will be recorded by the striking of the pins 31 against the lower side of star wheel 32, and the consequent rotation of the worm or screw 34 in the direction to move the pointer to the right to indicate a charge, and this will take place whether any current is being taken by the lamps or not. On the other hand if current is taken by the lamps the star wheel 32 will be engaged by a proportionate number of the plungers 41 to turn the worm in the opposite direction and indicate a discharge, whether any current is flowing to the batteries or not. Between the plungers, on the left-hand face of sprocket wheel 30, is a series of inclined cams 45, which serve to move the armature of magnet A' away from that magnet after it has acted on each plunger.

At the right-hand end of the indicating and recording device is mounted the mechanism for turning the paper reel as the worm 34 is turned. On a sleeve at this end of the worm-shaft is loosely mounted ratchet wheel 46 with which engages a pawl 47 pivoted to the frame of the device and arranged to prevent the rotation of ratchet wheel 46 in a clockwise direction as seen in Fig. 3. Fixed to the extreme end of the shaft of worm 34, and partaking of the rotary movement thereof, is an arm 48 carrying a second pawl 49 arranged to slide over the ratchet 46 in a clockwise direction and to turn that ratchet in a counter-clockwise direction. Projecting from the inner face of ratchet 46 is a pin 50, arranged to strike star wheel 51, mounted for rotation on a stub-shaft supported on the frame. This stub shaft carries a pinion 52, driven by a star wheel 51 which meshes with gear 53 on the end of the shaft of the main paper reel 39, which reel is arranged in conjunction with a reverse paper reel 54, as best shown in Fig. 5. These reels are mounted in suitable bearings 55 and 56 respectively.

The regulator used in connection with the present invention is fully described in my prior patents above referred to, but so much of it as is necessary for an understanding of the present invention is shown in Fig. 7, in which the rheostat arm R' controls the resistance of the field magnet circuit of the generator (as will be understood from an examination of the diagram of circuit connections). This rheostat arm is controlled in its movement by the regulator magnet E', which has a main winding $e^7$ in series with the generator, and a reverse main winding $e^8$ in series with the lamp circuit, the function of which is to weaken the effect of the main series winding $e^7$ as the lamp current increases, and thereby to increase in a certain proportion the generator current as the lamps are turned on. As used in connection with the present system the magnet E' also carries a coil $e^9$ which is in shunt to the generator circuit, and is wound in a direction to assist the effect of the series coil $e^7$, but does not become effective until the battery is fully charged, as will be further explained. Armature $a$ of magnet E' is carried by lever 11, which is pivoted to a stationary support. When the lever 11 is in the normal position, seen in Fig. 7, the cam 8, which is splined on the shaft 6 driven by the regulator motor, rotates between two rolls 15 and $15^a$ on lever 11, without actuating the lever sufficiently to cause the pawls 12 and $12^a$ to engage the ratchets 10 and $10^a$, which are reversely arranged and attached to the rheostat arm R'. Lever 11 is steadied in its normal position, against the attraction of magnet E', by two springs 16 and 18, and under normal conditions the effect of the springs is balanced by the pull of the magnet to maintain the parts in the inactive position shown, so that although the cam is rotating between the rollers 15 and $15^a$, it does not move the rheostat arm. When, however, the generator current increases beyond the predetermined limit the magnet E' is strengthened and its armature is attracted, turning the lever 11 on its pivot to depress its outer end carrying the pawls 12 and $12^a$. When this occurs the spring plate 13 is pressed against pawl 12 to force it into engagement with ratchet 10, whereupon the rocking of the lever 11, due to the cam 8, turns the rheostat arm R' in a direction to cut resistance into the field magnet circuit. If the magnet E' is weakened, the armature is depressed by the springs, and the pivoted pawl $12^a$ is made effective to cut resistance out of the field magnet circuit. A detailed description of this regulating device, which has just been generally described, will be found in my prior patents above mentioned.

Having thus described the mechanical construction and mode of operation of the indicating and recording device, and of the regulating device, we are in a position, upon referring to the diagram of circuit connections Fig. 9, to understand the operation of the charging system as a whole. We may assume that the battery is entirely discharged and the generator is at rest, in which case all the parts will be in the position shown in the drawings with all the magnets inert. Upon starting the generator D, its field magnet F receives current as follows: From the positive brush, to and through a fuse block B through wire $c$, through rheostat R', wire $c'$, field magnet F to the negative brush. At the same time the motor M which drives the cam shaft of the regulator will be supplied with current as follows: Through wires $c$, $h$ and $g$, through contacts $w^5$ and $w^6$ on switch EB through wire $f$, through the field and armature of the motor in parallel and wire $f$ back to the negative brush of the generator. The shunt coils $x$ of the automatic circuit-breaking switch AS are excited by current flowing through $c$, $h$, $h'$, and the coils $x$ to the junction with wire $f$. The automatic switch is so set that when the electromotive force of the generator has reached a point sufficiently high to warrant the connecting of the generator to the storage battery, the current through these coils $x$ will actuate the automatic switch AS to close it at the point $y$ and thereby close the main battery circuit $d$. This circuit is from the positive brush of the generator to and through the fuse block B, through $d$, through series winding $e^7$ of the regulator magnet E', through the series winding $x'$ on automatic switch AS and through $d$ to the positive pole of the battery and through the battery to the negative brush of the generator.

The capacity of the generator is so chosen that as its electromotive force increases, as for example from the increased speed of the train in train lighting systems, the increase of the current in the coils $e^7$ of the regulating magnet E' almost immediately produces sufficient magnetism to begin to cut resistance into the field circuit of the generator in the manner already described. As soon as this movement has started the switch $e^{10}$ (see Figs. 7 and 9) is released by the arm of rheostat R' and allowed to close, whereupon current flows from wire $d$ through the circuit $e^3$ and the coils of the magnet B' and wire $f'$ to the wire $f$ and back to the negative brush. This current energizes magnet B' and attracts its armature thereby projecting the star wheel 32 into position to be struck by the charge-indicating pins 31 on sprocket wheel 30, so that as sprocket wheel 30 revolves, star-wheel 32 will be struck on its lower side by the six pins 31 and will, therefore, turn the worm 34 in a direction to indicate a charge of the storage battery. It will be observed that when the battery is thus being charged from the generator, and the lamps are not burning, the motor is continuously driven from the generator circuit, and the generator is regulated to a constant current output by the regulating magnet E'. The position of pointer 37, resulting from this direct charging of the storage battery will, therefore, indicate with substantial accuracy the number of ampere hours to which the battery has been charged. When this charge, and the resultant movement of the pointer 37, has continued to a point where the battery has been charged at the normal charging current (which will preferably be about thirty amperes) for about one hour, then projection 40 on nut 36 closes switch G'. The function of this switch is to control the circuit of the emergency bank of lamps L' in such manner that when the switch 13

G' is open no current can flow to any lamps from the storage battery, and when this switch is closed current can flow to the emergency bank, but not to the main banks. The manner in which the switch so controls the emergency bank of lamps will be further described hereinafter. As the charging of the battery continues projection 40 will close snap switch D'. The purpose of this switch is to control the circuit of the main banks of lamps, so that no current can flow to the main banks unless this switch D' is closed. This switch D' is preferably so placed with respect to the indicating and recording mechanism that it is closed when the normal charging current has been flowing to the battery for about four hours. After the charging has continued to the full number of ampere hours to which it is intended to charge the battery, projection 40 on nut 36 will close snap switch C', thereby cutting the charging current down to a point where it is only sufficient to maintain the battery charge by compensating for leakage and similar losses, but is not sufficient to positively charge the battery to excess. The closing of switch C' effects this function by completing the circuit of the magnet of charge-reducing switch CR, as follows: From $e$ through $d'$, coils on magnet of switch CR, snap switch C', and through $d'$, $f'$ and $f$ to negative terminal. If the battery has been charged to the maximum voltage desired, say $2\frac{1}{2}$ volts per cell, the armature lever of switch CR will close contact $e^5$, completing a circuit through coil $e^9$ of regulating magnet E' as follows: From $e$ through $e^4$, coils $e^9$, $e^4$, contact $e^5$, $e^4$, $f'$ and $f$ to the negative terminal. If the charging current has not brought the battery to the desired maximum electromotive force when the switch C' is closed, then the generator will continue to supply the normal charging current until the electromotive force has reached the desired maximum and thereby closed the potential-operated switch CR. The foregoing instrumentalities, therefore, are so arranged that when the battery is charged from the generator the indicating and recording device is actuated to indicate and record the continuation of the full charging current (which is ordinarily taken at about thirty amperes) for a predetermined period of time, at the end of which time the current is automatically reduced so as to change it from a charging current to a current which is so small that it merely serves to maintain the battery charge, and is in effect merely a maintaining current.

In order that the indicating and recording device shall indicate and record a discharge from the storage battery to the lamps the mechanism previously described for rotating the worm 34 in the reverse direction including series magnet A' and plunger 41, is employed. The operation of this mechanism is automatically controlled, whenever a lamp is lighted by means of the automatic controlling switch EB in the following manner: When any lamp on the emergency bank of lamps L', for example, is turned on a small current will flow in a shunt around the main lamp circuit contacts $e^2$ and through the high resistance coils $k$ of the switch EB as follows:—From the point $z$ (which is connected to the positive terminal of the battery and is also connected to the positive terminal of the generator) through wire $e$, through the coils on the magnet A', wire $e$, coils $e^8$ on the regulating magnet through lamp rheostat R, wire $e$, wire $e'$, coils $k$, wire $e'$, coils $k'$, wire $e$ and $e^6$ to the emergency bank of lamps and through the lamp which has been turned on and the return wire to the negative terminal of the battery or generator as the case may be. This small current is sufficient to attract the armature of the switch EB to close contacts $f^2$, which, if the snap switch G' is closed, that is if the battery contains the desired minimum charge, will complete a circuit through coils $l$ on switch EB as follows: From $e$ through $f'$, coils $l$, contacts $f^2$, snap switch G', wire $f'$, wire $e^3$ and wire $f'$ and $f$ to the negative terminal. When these coils $l$ are energized the armature associated therewith closes contacts $e^2$, thereby closing the main lamp circuit from the positive terminal of the generator through fuse block B through wire $d$, coils $e^7$ on the regulator magnet coils $x'$ on the automatic switch, the contacts of that switch, to the point $z$ and from there through $e$ through coils of series magnet A', through reverse coils $e^8$ on the regulating magnet E', through $e$ to the lamp resistance and through rheostat R to $e$, contacts $e^2$, series coils $k'$ of switch EB, wire $e$ and $e^6$ to the emergency bank of lamps. The movement of the armature which closes contacts $e^2$ will open contacts $w^5$ and $w^6$ and close contacts $w^3$ and $w^4$ thereby changing the motor supply from the generator to the battery. If the charge to the storage battery has been continued so long a time that the snap switch D' has been closed current will flow from wire $d$ through wire $f^4$, coils of switch LB, wire $f^4$, snap switch D', wire $f^4$ to wire $e^3$, wire $f'$ and wire $f$ to the negative terminal. This current will excite the magnet of switch LB and close that switch thereby completing the circuit to the main bank of lamps L². It will, therefore, be observed that flow of current to the lamps will at once transfer the motor of the regulator from the generator circuit to the battery circuit and will at the same time excite the magnet A'. As the current flow through that magnet, which is in series with the lamps, increases the magnet will actuate lever 43 and roller 44 to depress the appropriate number of plungers 41, thereby giving to the star wheel 32 an appropriate number of turns in a direction opposite to the movement imparted to the star wheel by the pins 31, thereby indicating a discharge from the battery.

It will be seen then that when the generator is charging the batteries to the normal amount of thirty amperes, and assuming that no lamps are lighted, each rotation of the sprocket wheel 30 will impart to the star wheel 32 six movements in a direction to indicate a charge. If, on the other hand, all of the lamps are lighted when the generator is not running, and the lamps are being fed from the battery, then each rotation of the sprocket wheel 30 will impart to the star wheel 32 eight movements in a direction to indicate a discharge. It will, therefore, be observed that for an equal current flow that movement of the pointer which indicates a discharge is relatively exaggerated, as compared with the corresponding movement in a direction to indicate a charge. This course is adopted for the following reasons: (a) It is primarily intended that the pointer 37 should indicate approximately the number of ampere hours available in the battery for lighting the lamps. The numbers on the scale indicate the hours figured on a basis of, say, thirty amperes, or whatever convenient number is adopted as the normal charging current. It is a fact, however, that the output capacity of a battery falls below the energy which has been expended in charging it by a percentage which is fairly constant and ranges around twelve per cent. One object then of indicating less than the ampere hours of charging is to make up for this loss; (b) it is also true that the effective value of the charging current varies to some extent on account of the internal condition of the battery, temperature, etc., and there is a certain loss in the battery from leakage, etc., all of which things tend to diminish the effective charge below what it would be under theoretically perfect conditions. Moreover, a slight overcharge of the battery, or an indication of slightly less charge than the battery actually contains, is to be preferred to an undercharge or to an excessive indication, under practical conditions. Another object, then, of indicating less than the actual ampere hours of charging is to allow for these variations and insure that the battery shall certainly be capable of giving the indicated output; and rather more than less.

From the foregoing description of the operation of the indicating and recording device when the battery is being fed from the generator and the lamps are not burning, and when the battery is disconnected from the generator and the lamps are burning, it may be understood that when the generator is charging the battery, and at the same time the lamps are burning, the operation of the pins 31 and the plungers 41 on the star wheel 32 takes place simultaneously. That is, under such conditions the indicating and recording device is actuated by the current flowing to the battery to indicate a charge and is actuated by the current flowing to the lamps to indicate a discharge. The battery is not, of course, being charged and discharged at the same time, but when the generator is called upon to carry the load of the lamps the charging current to the batteries is reduced and this reduction is properly indicated by the actuation of the indicating device in a direction to show a discharge. For practical purposes I have found it advantageous to so adjust the regulating magnet E' that the amount of resistance cut out from the field magnet circuit, when current is turned on to the lamps, will allow an increase of the current output of the generator equal to about one-third of the current taken by the lamps. For example, the storage battery may ordinarily be supplied, when all the lamps are cut out, with a current of 30 amperes. If then we suppose that a sufficient number of lamps are turned on to take ten amperes, the regulating magnet E' will cut enough resistance out of the field magnet circuit to increase the current flowing to $33\frac{1}{3}$ amperes, of which ten amperes will flow to the lamps and $23\frac{1}{3}$ to the battery. With this current flow of ten amperes the star wheel 32 will continue to be given six advance turns by the pins 31, and it will be given but two turns by the plungers 41, those plungers being set so that an additional plunger is actuated upon each increase of five amperes. The result is that the star wheel 32 will in effect be given but four advance turns, that is, $\frac{2}{3}$ of the advance turns which are given to it when the full current of 30 amperes is flowing to the battery, so that the indication on the indicating device is $\frac{2}{3}$ of what it was before, which in this particular example would be an indication of twenty amperes, whereas, as a matter of fact, the actual charge to the batteries—$23\frac{1}{3}$ amperes—is somewhat in excess of $\frac{2}{3}$ of the normal charge of thirty amperes. By this arrangement the indication of discharge is again relatively exaggerated for the purposes described above.

With respect to the recording device it will be observed that upon the advance turns of the worm 34 the pawl 49 on arm 48 slides over ratchet 46 without turning the paper reel, so that the record of the charge will be a straight line. Upon the reverse actuation of the worm 34, however, the pawl 49 will engage ratchet 46 and turn it and this turning will eventually turn star wheel 51 and through the connecting gear will turn the paper reel thereby indicating by a broken line the amount of discharge.

It has already been pointed out that when pointer 37 reaches the right-hand end of the scale, projection 40 closes switch C', but if the potential in the battery is not high enough to actuate switch CR the charging current will continue. This would, of course, continue the rotation of the worm 34, and that this may be possible the screw threaded worm is discontinued at the proper point and a spring-pressed collar 70 slides on the smooth portion of the worm shaft 71. At the moment when projection 40 actuates switch C' to close it, nut 36 runs off the end of the worm 34 on to the smooth portion 71 of the worm shaft, having at that time moved spring-pressed collar 70 to the right as seen in Fig. 2. The further rotation of the worm 34 can, therefore, take place without moving nut 36. If now a discharge begins, nut 36 will be forced on to the thread of worm 34 and the pointer will continue its indication. The reverse movement of the nut will cause projection 40 to open snap switch C', thus cutting out coils of switch CR and coils $e^9$ of magnet E'. When pointer 37 has been moved back by the discharge until there is only an indicated charge of about four hours in the battery then switch D' will be opened automatically, thereby cutting out all the lamps except the emergency circuit, and compelling a conservation of the remaining charge in the battery by limiting its use to the emergency lamps. Upon a further reduction of the battery charge to an indicated charge of about one hour, snap switch G' will be opened automatically by projection 40 to cut out the emergency lamps, thereby absolutely preventing an over-discharge of the battery. The lamp resistance R is inserted for the purpose of regulating the current flow to the lamps and is automatically controlled by a mechanism similar to the controlling mechanism governed by magnet E', which mechanism forms no part of the present invention, but is fully disclosed in my prior patents above enumerated.

This system then provides for so regulating the output of the generator that it will charge the battery under constant current conditions, regardless of the electromotive force of the battery (including its internal resistance drop) for a predetermined number of ampere hours; and after that predetermined period of charge has elapsed, the charging current to the battery will be automatically reduced if, or when, the electromotive force of the battery reaches a predetermined point, but will not be reduced until the electromotive force of the battery does reach that point. This insures a full charge of the battery, but prevents an excessive over-charge. The system also provides for automatically opening the battery circuit when its charge has fallen to a predetermined point, to thereby prevent an over-discharge; and more specifically it provides for conserving the charge of the battery when it has fallen below a certain point by automatically cutting out all of the lamps except those on the emergency circuit. The system furthermore provides an arrangement by which the turning on of any lamp in the supply circuit will automatically close the main lamp circuit, and when all of the lamps are turned off the main lamp circuit will be automatically opened. This automatic controlling switch is, however, so connected with the indicating and recording device that no current can flow from the battery to any of the lamps, unless a predetermined minimum charge is contained in the battery and if the charge in the battery is below a certain other minimum amount, it will be conserved for use exclusively on the emergency bank.

What I claim is:—

1. In an electric current-supply system, a generator, a supply circuit extending therefrom and containing translating devices, a storage battery shunted across said circuit, and a potential-operated circuit-breaker in the circuit between the storage-battery and the generator and set to open the circuit when the generated electromotive force falls below a predetermined point and to close the circuit when the generated electromotive force rises to that point, in combination with a switch between the storage battery shunt and the translating devices and having contacts for opening and closing the translating device circuit, a shunt about said contacts, and mechanism for actuating the said switch contacts excited by the current which flows through said shunt when the supply circuit is completed through any translating device.

2. In an electric current-supply system, a supply circuit containing translating devices, an intermittently operated generator in said circuit, a storage battery shunted across said circuit, a current-operated regulator for the generator, a motor constituting an operative part of said regulator, a switch controlling the flow of current to the translating devices, and connections controlled by said switch for exciting the regulator motor from the generator circuit when no current is flowing to the translating devices and from the battery circuit when current is flowing to the translating devices.

3. In a current-distribution system, a generator, a supply circuit extending therefrom and containing translating devices, a storage battery connected across the circuit, a switch excited by the current flowing to the translating devices to open and close the supply circuit, a device for indicating the charge in the storage battery, and a switch controlled by the indicating device to prevent the closing of the supply-circuit switch when the battery charge is below a predetermined minimum.

4. In a current-distribution system, a supply circuit containing a generator and translating devices, a storage-battery connected across the circuit, and a device for indicating the charge in the storage battery comprising an indicator, means controlled by the current flowing to the storage battery to move the indicator in one direction, and a magnet in series with the translating devices and excited by the current flowing to said devices to effect the movement of the indicator in the opposite direction.

5. In a current-distribution system, a supply circuit containing a generator and translating devices, a storage battery connected across the circuit, and a device for indicating the charge in the storage battery comprising an indicator, means controlled by the current flowing to the storage battery to move the indicator in one direction, a plurality of devices arranged to move the indicator in the opposite direction, and a magnet in series with the translating devices for actuating a progressively increasing number of said plurality of indicator moving devices as the strength of the current increases.

In testimony whereof I affix my signature, in presence of two witnesses.

PATRICK KENNEDY.

Witnesses:
  WILLIAM H. DAVIS,
  LAURA B. PENFIELD.